United States Patent [19]

Moersch et al.

[11] 3,742,068

[45] June 26, 1973

[54] ETHERS OF 2,2,9,9-TETRAMETHYL-1,10-DECANEDIOL

[76] Inventors: George W. Moersch, 645 Riverview, Ann Arbor, Mich. 48104; Paul L. Creger, 1730 Covington Drive, Ann Arbor, Mich. 48103

[22] Filed: Apr. 17, 1970

[21] Appl. No.: 29,704

[52] U.S. Cl. 260/615 R, 260/448.8 R, 260/465.8 R, 260/554, 260/595, 260/601 R, 260/635 D, 260/999
[51] Int. Cl. .................... C07c 41/10, C07c 43/04
[58] Field of Search ................................ 260/615 R

[56] References Cited
UNITED STATES PATENTS

| | | | |
|---|---|---|---|
| 2,234,200 | 3/1941 | Soltzberg | 260/615 R |
| 2,258,892 | 10/1945 | Harris | 260/615 R |
| 2,302,121 | 11/1942 | Harris | 260/615 R |

*Primary Examiner*—Howard T. Mars
*Attorney*—Robert R. Adams, David B. Ehrlinger, George M. Richards and Edward J. Gall

[57] ABSTRACT

1.10-Di-(lower alkoxy)-2,2,9,9-tetramethyldecanes, and structurally-related trialkylsilyl compoiunds, aldehyde, ketone, and semicarbazones. The compounds lower serum triglyceride levels. The 1,10-di-(lower alkoxy) compounds can be produced by reacting 2,2,9,9-tetramethyl-1,10-decanediol with a lower alkylating agent in the presence of a base. The trailkylsilyl compounds can be produced by reacting the same diol with a silylating agent. The aldehyde can be roduced by hydrolysis of a substituted imine. The ketone can be produced by reacting a carboxylic acid, carboxylate salt, or nitrile with methyllithium under anhydrous conditions, followed by hydrolyzing the product. The aldehyde and ketone can be converted to semicarbazone derivatives by reaction with semicarbazide or its acid-addition salt.

2 Claims, No Drawings

ETHERS OF 2,2,9,9-TETRAMETHYL-1,10-DECANEDIOL

SUMMARY AND DETAILED DESCRIPTION

The present invention relates to new polymethylene compounds. More particularly, the invention relates to new functionally-substituted tetramethylpolymethylene compounds of the formula

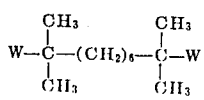

and to methods for their production. In this formula W can represent (a) a group of the formula

-CH$_2$OY in which Y represents lower alkyl or a group of the formula

wherein each of R$^1$ and R$^2$ represents methyl or ethyl; and W can also represent (b) a group of the formula

in which X represents oxo (=O) or semicarbazono

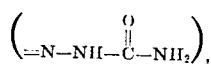

and R$^3$ represents hydrogen or methyl. The lower alkyl groups are alkyl groups of preferably not more than 4 carbon atoms.

In accordance with the invention, the lower alkyl ethers of the invention, that is, the compounds wherein W represents

-CH$_2$OY and Y represents lower alkyl, can be produced by reacting 2,2,9,9-tetramethyl-1,10-decanediol with a lower alkylating agent in the presence of a base. The preferred lower alkylating agents are esters of an alkanol having the formula

R$^4$—OH where R$^4$ represents an alkyl radical or preferably not more than 4 carbon atoms. Some examples of such esters are methyl iodide, ethyl bromide, ethyl iodide, isopropyl bromide, butyl chloride, butyl iodide, dimethyl sulfate, and methyl p-toluenesulfonate. Some examples of bases suitable for use in the reaction are sodium hydride, sodium amide, n-butyllithium, phenyllithium, and other strong bases of alkali metals. A preferred base is sodium hydride. Some examples of solvents suitable for use in the reaction are diethyl ether, diethylene glycol dimethyl ether, dimethoxyethane, tetrahydrofuran, dimethylformamide, dimethyl sulfoxide, or an excess of the lower alkylating agent. A preferred solvent is dimethylformamide. Two equivalents of the lower alkylating agent are theoretically necessary for reaction with each mole of 2,2,9,9-tetramethyl-1,10-decanediol and, in practice, it is customary to use a quantity of the lower alkylating agent in excess of the calculated amount. The time and temperature of the reaction are not critical and depend somewhat on the reactants employed. In general, the reaction is carried out at a temperature of from 0° to 150° C. or the reflux temperature of the solvent for from 2 to 48 hours. Using sodium hydride as the base, the reaction is normally carried out at a temperature between room temperature and 45° C. for from 3 to 24 hours. It is convenient to hydrolyze the mixture before isolation of product.

The 2,2,9,9-tetramethyl-1,10-decanediol, employed as starting material in the foregoing process, can be prepared by any of a variety of methods. For example, it can be obtained by reducing 2,2,9,9-tetramethyldecanedioic acid or a lower alkyl ester thereof. The reduction is usually carried out by reacting the acid or ester with a complex metal hydride such as lithium aluminum hydride, lithium aluminum hydride-aluminum chloride, aluminum hydride-aluminum chloride, or sodium borohydride-aluminum chloride in an anhydrous ethereal solvent, followed by hydrolyzing the reaction mixture. In the case of reduction of a lower alkyl ester, other reducing agents can also be used such as sodium borohydride in aqueous ethanol.

Also in accordance with the invention, the disila compounds of the invention, that is, the compounds wherein W represents -CH$_2$OY and Y represents a group of the formula

wherein each of R$^1$ and R$^2$ represents methyl or ethyl, can be produced by reacting 2,2,9,9-tetramethyl-1,10-decanediol with a silylating agent in an anhydrous, nonhydroxylic solvent. Some examples of suitable silylating agents are hexaalkyldisilazanes, N,O-bis(trialkylsilyl)acetamides, N-trialkylsilylacetamides, N-(trialkylsilyl)dialkylamines, and trialkylchlorosilanes in the presence of a tertiary amine such as pyridine. The preferred silylating agents are hexaalkyldisilazanes of the formula

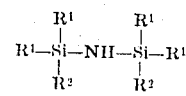

in which R$^1$ and R$^2$ are as defined before. Some examples of such hexaalkyldisilazanes are hexamethyldisilazane, hexaethyldisilazane, 1,3-diethyl-1,1,3,3-tetramethyldisilazane, and 1,1,3,3-tetraethyl-1,3-dimethyldisilazane. Some examples of suitable anhydrous, non-hydroxylic solvents are hydrocarbons such as benzene, toluene, xylene, and cyclohexane; chlorinated hydrocarbons such as chloroform, carbon tetrachloride, and chlorobenzene; ethers such as dioxane, tetrahydrofuran, dimethoxyethane, dibutyl ether, and diethylene glycol dimethyl ether; or an excess of the disilazane used as a reactant. Some preferred solvents are toluene or excess disilazane reactant. The hexaalkyldisilazanes which are the preferred silylating agents, as indicated above, are most suitably used in the presence of an anhydrous acidic catalyst. Some examples of such catalysts are ammonium sulfate, ammonium chloride, ammonium bromide, ammonium dihydrogen phosphate, hydrogen chloride, hydrogen bromide, hydrocarbon sulfonic acids, and cation exchange resins in the hydrogen ion form. The anhydrous acidic catalyst can also be generated in situ, as by forming hydrogen chloride by adding a trace amount of a trialkylchlorosilane to the reaction mixture. At least the calculated amount and preferably an excess of the silylating agent is employed. The time and temperature of the reaction are not particularly critical but they depend somewhat on the particular silylating agent. In general, it is suitable to carry out the reaction at a temperature from 0° to 175° C. or the reflux temperature of the solvent for from 30 minutes to 18 hours. In the case of the hexaalkyldisilazanes, the usual conditions are room temperature to 100° C. for up to 18 hours. In most cases, a reaction time of one hour at room temperature is sufficient.

Further in accordance with the invention, the aldehyde of the invention, that is, the compound wherein W represents

in which X represents oxo and $R^3$ represents hydrogen, said compound being 2,2,9,9-tetramethyldecanedial, can be produced by reacting a compound of the formula

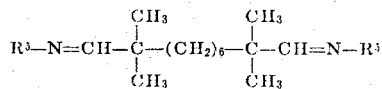

with a hydrolytic agent; where $R^5$ represents a hydrocarbon radical or substituted hydrocarbon radical of not more than 10 carbon atoms. Some examples of hydrocarbon radicals which $R^5$ can represent are methyl, ethyl, isopropyl, butyl, tertiary butyl, hexyl, decyl, cyclopentyl, cyclohexyl, and methylcyclohexyl. When $R^5$ represents a substituted hydrocarbon radical the nature and number of substituents are unimportant as the group $R^5$ is lost during the course of the reaction. A preferred example of $R^5$ is cyclohexyl. Some examples of suitable hydrolytic agents are water, aqueous solutions of mineral acids such as hydrochloric acid, phosphoric acid, or sulfuric acid, and aqueous solutions of organic acids such as acetic acid or p-toluenesulfonic acid. If desired, an organic solvent such as tetrahydrofuran, a lower alkanol, or a lower alkanone can also be present. A preferred hydrolytic agent is aqueous hydrochloric acid optionally in the presence of tetrahydrofuran or other organic solvent. At least the calculated amount and preferably a large excess of the hydrolytic agent is used. The time and temperature of the reaction are not especially critical. In general, the reaction is carried out at a temperature from 0° to 125° C. or the reflux temperature for from 1 hour to 24 hours, the longer reaction times being used at the lower temperatures. At a temperature of about 30°–35° C. with dilute hydrochloric acid, the reaction is normally substantially complete within less than 24 hours.

Starting materials required for use in the foregoing process can be prepared in any of a number of ways. For example, an imine of the formula

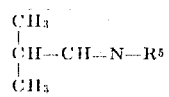

is reacted with lithium diisopropylamide and then with 1,6-dibromohexane to produce an imine employed as starting material in the process of the invention; where $R^5$ is as defined before. If desired, the preparation of this starting material can be carried out in situ and the reaction with the hydrolytic agent can be carried out directly by treatment of the reaction mixture with, for example, dilute hydrochloric acid or other hydrolytic agent.

Still further in accordance with the invention, the ketone of the invention, that is, the compound wherein W represents

in which X represents oxo and $R^3$ represents methyl, said compound being 3,3,10,10-tetramethyl-2,11-dodecanedione, can be produced by reacting a compound of the formula

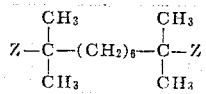

with methyllithium in an anhydrous medium, followed by hydrolyzing the product; where Z represents carboxyl (-COOH), a carboxylate salt group (-COOM, where M represents one equivalent of a metal, especially an alkali metal or an alkaline earth metal), or cyano (-CN). Some examples of suitable solvents for the first step of the process are anhydrous, non-hydroxylic solvents such as benzene, toluene, xylene, and other aromatic hydrocarbons; and tetrahydrofuran, diethyl ether, dimethoxyethane, dimethoxymethane, and other ethers. A preferred solvent is tetrahydrofuran. The required ratio of reactants depends on the particular starting material used. When Z represents carboxyl, four moles of methyllithium are required for each mole of dicarboxylic acid. In this case, two moles of methyllithium are first consumed in forming the lithium salt of the starting material. When Z represents cyano or a carboxylate salt, two moles of methyllithium are required for each mole of such starting materials. However, it is preferred to use an excess over these calculated amounts of methyllithium. The time and temperature for the first step of the process are not critical, and the reaction in anhydrous medium is usually carried out at a temperature from 0° to 115° C., or the reflux temperature of the solvent, for from 30 minutes to 24 hours. In general, the reaction is substantially complete within a few hours at 30°–65° C. As the second step of the process, the product formed in the anhydrous step is then hydrolyzed with water or other aqueous medium such as dilute aqueous acid or dilute aqueous base.

Starting materials required for use in the foregoing process are known or can be prepared in any of a number of ways. The carboxylate salts can be prepared by reacting 2,2,9,9-tetramethyldecanedioic acid with a base. 2,2,9,9-Tetramethyldecanedinitrile can be prepared by reacting isobutyronitrile with lithium diisopropylamide and then with 1,6-dibromohexane.

Yet further in accordance with the invention, the disemicarbazones of the invention, that is, the compounds wherein W represents

in which X represents semicarbazono and $R^3$ represents hydrogen or methyl, can be produced by reacting a compound of the formula

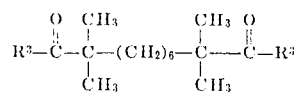

with semicarbazide or an acid-addition salt thereof; where $R^3$ is as defined before and consequently represents hydrogen or methyl. The reaction can be carried out under acidic, neutral, or slightly basic conditions. However, the use of moderately acidic conditions (pH about 4.5) is preferred. Some suitable solvents for use in the reaction are lower alkanols and aqueous lower alkanols. Hydrocarbons capable of forming azeotropic mixtures with the water formed in the reaction are also suitable solvents. A preferred solvent is aqueous ethanol. Two moles of semicarbazide or acid-addition salt are theoretically necessary for reaction with each mole of the aldehyde or ketone employed as starting material and, in practice, it is customary to use a quantity of semicarbazide or acid-addition salt in excess of the calculated amount. A preferred reactant is semicarbazide hydrochloride. The time and temperature of the reaction are not especially critical. In general, the reaction is carried out at a temperature from 20° to 115° C. or the reflux temperature of the solvent for from 30 minutes to 24 hours. At temperatures of 50° to 75° C., the reaction is normally substantially complete within less than 1 hour.

The components of the invention can exist in anhydrous form as well as in solvated, including in some cases hydrated, forms. In general, the hydrated forms and the solvated forms with pharmaceutically-acceptable solvents are equivalent to the anhydrous or unsolvated form for the purposes of the invention.

The compounds of the invention are new chemical substances, of value as pharmacological agents which reduce serum triglyceride levels. An important property of these compounds is that they reduce serum triglyceride levels while causing only a lesser reduction and in some cases no reduction in serum cholesterol levels. The effectiveness of the compounds of the invention in lowering serum triglycerides can be demonstrated by standard methods. For example, male rats weighing 200–250 g. are maintained on a normal pellet diet. Each animal in a treatment group is given a daily oral dose of a test compound for 7 days. Commonly a test compound is first studied at a daily dose of 250 mg./kg. body weight; in subsequent groups of rats, the dose is progressively lowered until the compound no longer exhibits significant activity. An untreated control group is also maintained. At the end of the 7-day test period the animals are weighed and sacrificed, and the serum cholesterol and serum triglycerides are determined from blood samples taken from the vena cava. The methods used are described in "Journal of Laboratory and Clinical Medicine," 50, 318 (1957) and "Journal of Laboratory and Clinical Medicine," 50, 152 (1957). The test compound is considered to exhibit a side effect if the weight of the animals in the treatment group is significantly less than the weight of the animals in the control group. In representative determinations, the following compounds of the invention at the indicated daily dose levels for 7 days produced the indicated reduction of serum triglycerides, reduction of serum cholesterol, and weight gain inhibition relative to the untreated control group. 1,10-Dimethoxy-2,2,9,9-tetramethyldecane, 112 mg./kg. per day; 83% reduction of serum triglycerides; 21% reduction of serum cholesterol; 25% weight gain inhibition. 2,2,9,9-Tetramethyldecanedial, 100 mg./kg. per day; 87% reduction of serum triglycerides; 28% reduction of serum cholesterol; 20% weight gain inhibition. 3,3,10,10-Tetramethyl-2,11-dodecanedione, 100 mg./kg. per day; 50% reduction of serum triglycerides, no effect on serum cholesterol or weight of the animals relative to the untreated control group. In addition to administration by the oral route, as described above, the compounds of the invention can also be given by the parenteral route if desired.

The invention is illustrated by the following examples.

EXAMPLE 1

A solution of 23 g. of 2,2,9,9-tetramethyl-1,10-decanediol in 250 ml. of dimethylformamide is added to a mixture of 7.2 g. of sodium hydride (prepared from a dispersion in mineral oil, washed free of mineral oil with heptane) in 200 ml. of dimethylformamide. The mixture is heated at 45° C. for one hour or until hydrogen evolution ceases. The mixture is then cooled and 43 g. of methyl iodide is slowly added. The mixture is stirred an additional 2 hours at 40° C. and another portion of 43 g. of methyl iodide is slowly added. It is then stirred at room temperature for 18 hours, diluted with one liter of water, and extracted with hexane. The hexane extract is washed with water, dried over anhydrous magnesium sulfate, and concentrated under reduced pressure to give a residue of 1,10-dimethoxy-2,2,9,9-tetramethyldecane. For purification, the product is distilled in vacuo; b.p. 162°–164° C. at 20 mm.

The starting material can be obtained as follows. With stirring at room temperature, 25.8 g. of 2,2,9,9-tetramethyldecanedioic acid in 175 ml. of dry tetrahydrofuran is added over a period of 20 minutes to a slurry of 8.6 g. of lithium aluminum hydride and 400 ml. of dry ether. The mixture is heated at reflux for 2 hours, treated successively with 8.6 ml. of water, 8.6 ml. of 15% sodium hydroxide solution, and 17.2 ml. of water, and filtered. The filtrate is concentrated to a small volume to give 2,2,9,9-tetramethyl-1,10-decanediol; m.p. 61°–62° C. following crystallization from acetonitrile.

EXAMPLE 2

A mixture of 11.5 g. of 2,2,9,9-tetramethyl-1,10-decanediol, 20 g. of hexamethyldisilazane, and 0.2 g. of trimethyl-chlorosilane in a small amount of toluene is heated to 90°–100° C. until a solution results. A small amount of insoluble white solid which may be present is ignored. The mixture is allowed to cool and stand at room temperature for 18 hours and is filtered. The filtrate is distilled in vacuo to give 2,2,5,5,12,12,15,15-octamethyl-3,14-dioxa-2,15-disilahexadecane; b.p. 94°–98° C. at 0.01 mm.

EXAMPLE 3

With stirring and cooling at 0°–10° C., 248 ml. of a 1.61 M solution of n-butyllithium in hexane is added to a solution of 40.4 g. of diisopropylamine in 350 ml. of anhydrous tetrahydrofuran. The resulting mixture contains lithium diisopropylamide. After 10 minutes, 60.9 g. of N-(isobutylidene)-cyclohexylamine is added and after an additional 15 minutes, 48.8 g. of 1,6-dibromohexane is added, the additions being made at such a rate that a temperature of 0°–10° C. is maintained. One hour later the mixture is allowed to warm to room temperature and stirred for 18 hours. At this point, the mixture contains N,N'-(2,2,9,9-tetramethyldecanediylidene)-biscyclo-hexylamine. It is stirred with 400 ml. of 2 N hydrochloric acid for 24 hours at 30°–35° C. The organic phase is separated, washed with 100 ml. of saturated sodium chloride solution, dried over anhydrous magnesium sulfate, and filtered. The filtrate is concentrated under reduced pressure to give a residue of 2,2,9,9-tetramethyldecanedial. For purification, the product is distilled in vacuo; b.p. 112°–113° C. at 1.0 mm.

EXAMPLE 4

A solution of 12.9 g. of 2,2,9,9-tetramethyldecanedioic acid in 450 ml. of anhydrous tetrahydrofuran is treated with 126 ml. of a 5.3% solution of methyllithium in ether. The resulting mixture is stirred at room temperature for ½ hour, heated at reflux for 5 hours, and stirred at room temperature for an additional 18 hours. It is then hydrolyzed by stirring it with 200 ml. of water. The hydrolyzed mixture is extracted with ether and the ether extract is dried over anhydrous magnesium sulfate and filtered. The filtrate is concentrated under reduced pressure to give a residue of 3,3,10,10-tetramethyl-2,11-dodecanedione; m.p. 49°–50° C. following crystallization from acetonitrile-methanol.

Similarly, by the substitution of an equivalent amount of 2,2,9,9-tetramethyldecanedinitrile for the 2,2,9,9-tetramethyldecanedioic acid, the use of one-half the quantity of methyllithium indicated above, and hydrolysis of the reaction mixture with 2 N hydrochloric acid, the product obtained is 3,3,10,10-tetramethyl-2,11-dodecanedione, m.p. 49°–50° C. following crystallization from acetonitrile-methanol.

The dinitrile employed as starting material in the above procedure can be obtained as follows. With stirring and cooling at 0°–10° C., 238 ml. of a 1.68 M solution of n-butyllithium in heptane is added to a solution of 41 g. of diisopropylamine in 350 ml. of anhydrous tetrahydrofuran. After 10 minutes, 27.6 g. of isobutyronitrile is added and after an additional 15 minutes, 48.8 g. of 1,6-dibromohexane is added, the additions being made at such a rate that a temperature of 0°–10° C. is maintained. One hour later the mixture is allowed to warm to room temperature and then held at 30°–35° C. for 18 hours. It is then cooled to 10°–15° C. and stirred with 250 ml. of water. The organic phase is separated, combined with an ether extract of the aqueous phase, washed with saturated aqueous sodium chloride, dried over anhydrous magnesium sulfate, and filtered. The filtrate is evaporated to give a residue of 2,2,9,9-tetramethyldecanedinitrile; m.p. 62°–63.5° C. following crystallizations from hexane.

EXAMPLE 5

A solution of 11.3 g. of 2,2,9,9-tetramethyldecanedial in 60 ml. of ethanol is treated at 50° C. with 12.3 g. of semicarbazide hydrochloride and then with a solution of 9.0 g. of sodium acetate in 120 ml. of 50% methanol. The mixture is heated at reflux for 1 hour, diluted with 120 ml. of 50% aqueous ethanol, and chilled until separation of product appears complete. The product is collected on a filter and washed with cold 50% aqueous ethanol. It is 2,2,9,9-tetramethyldecanedial, disemicarbazone; m.p. 199°–200° C. following crystallization from ethanol.

In the same manner, by the substitution of an equivalent amount of 3,3,10,10-tetramethyl-2,11-dodecanedione for the 2,2,9,9-tetramethyldecanedial, the product obtained is 3,3,10,10-tetramethyl-2,11-dodecanedione, disemicarbazone.

We claim:

1. A 1,10-di-(lower alkoxy)-2,2,9,9-tetramethyldecane of the formula

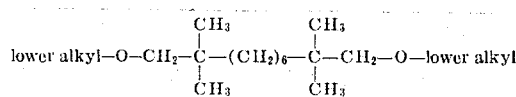

2. A compound according to claim 1 which is 1,10-dimethoxy-2,2,9,9-tetramethyldecane.

* * * * *